US005395689A

United States Patent [19]

Dethlefs

[11] Patent Number: 5,395,689

[45] Date of Patent: Mar. 7, 1995

[54] POLYOLEFIN-COATED PHOTOGRAPHIC SUPPORT MATERIAL

[75] Inventor: Ralf-Burkhard Dethlefs, Osnabruch, Germany

[73] Assignee: Felix Schoeller jr Foto- und Spezialpapiere GmbH & Co. KG, Osnabruck, Germany

[21] Appl. No.: 162,815

[22] Filed: Dec. 6, 1993

Related U.S. Application Data

[63] Continuation of Ser. No. 862,110, Apr. 2, 1992, abandoned.

[30] Foreign Application Priority Data

Apr. 2, 1991 [DE] Germany .......................... 4110622.9

[51] Int. Cl.[6] .......................... B32B 27/08; G03C 1/76

[52] U.S. Cl. .................................... 428/340; 428/323; 428/409; 428/513; 428/514; 428/534; 428/537.5; 428/478.8; 430/536; 430/538

[58] Field of Search ............... 428/340, 513, 514, 409, 428/537.5

[56] References Cited

U.S. PATENT DOCUMENTS

| | | | |
|---|---|---|---|
| 4,665,014 | 5/1987 | Katsura | 428/513 |
| 4,895,757 | 1/1990 | Wysk et al. | 428/513 |
| 5,008,150 | 4/1991 | Ashida et al. | 428/513 |
| 5,082,724 | 1/1992 | Katsura | 428/513 |

*Primary Examiner*—P. C. Sluby
*Attorney, Agent, or Firm*—Karl F. Milde, Jr.

[57] ABSTRACT

A photographic support material with a coating on each side. At least one of the coatings comprises a mixture of polyolefins and optional agents that have a positive effect on the utilization of the support material. A white pigment is an example. The polyolefin mixture comprising the coating contains at least one copolymer of an $\alpha$-olefin with an $\alpha$, $\beta$-unsaturated carboxylic acid. At least 5% and preferably 20% to 80% by weight of the mixture is copolymer.

15 Claims, No Drawings

POLYOLEFIN-COATED PHOTOGRAPHIC SUPPORT MATERIAL

This application is a continuation of application Ser. No. 07/862,110, filed Apr. 2, 1992, now abandoned.

BACKGROUND OF THE INVENTION

The present invention concerns a photographic support material with a coating on each side, at least one of the coatings comprising a mixture of polyolefins and optional or auxiliary agents, white pigments for example, that have a positive effect on the utilization of the support material.

The procedure of coating papers with thermoplastics for use as support materials for photographic coatings is known. Of primary interest to the manufacturer are water resistance, dimensional stability, and economy. Some of the coatings are polyolefins and olefin copolymers conventionally coated on both sides of the paper by melt extrusion. The "base paper" of the support material is primarily natural paper but can be a mixture of natural paper and plastic or a synthetic paper instead. Hereinafter, all of these types of paper are called "base paper".

The base paper employed in accordance with the invention in no way differs from those conventionally employed; for example, base paper with a basis weight of 170 g/m$^2$. It will preferably have a coating of hydrophobic resin (usually a polyolefin) on each side. The hydrophobic coating nearest the coatings that incorporate the photographic image will contain at least one light-reflecting pigment. The support material is therefore protected from the entry of water or photographic developing solutions, but will, of course, be unprotected from the entry of aqueous developing solutions at its edges. To counteract this, the support material is usually "hard-sized". Both such reactive substances as alkyl-ketene dimers and such non-reactive substances as the more complex fatty acids are well known sizes for photographic support material.

The reactive sizes are usually treated in the neutral range (neutral sizing) with a cationic resin. The non-reactive sizes are employed in the acidic range with aluminum ions added to them.

A combination of both sizing procedures is also known, for example, from the German Patent Publication No. OS 3,238,865.

The sizes are hydrophobic. They are introduced into the pulp and are precipitated onto the fibers by added agents. One of the agents employed with an acidic size for example is an aluminum salt. A cationic polyamide-polyamine epichlorohydrin resin can be employed with a neutral size. Such other substances as cationic polyacrylamides, starches, and polyethylene imines, however, are also appropriate in specific cases to help retain reactive sizes within the support material.

Since the hard sizing of the support material occasions a loss of strength, substances that will make it stronger are also added to the pulp. Examples of such substances are polyvinyl alcohol, anionic polyacrylamide, and various starch derivatives.

In addition to interior hydrophobing, the surface of the support material can be sized with complex-molecular substances. Complex-molecular substances that can be employed for this purpose include gelatins, oxidized starches and other starch derivatives, carboxymethylcellulose, polyvinyl alcohol, etc.

The surface of the support material is coated with an aqueous mass containing such agents as brighteners, pigments, cross-linking agents, etc., in addition to the aforesaid complex-molecular substances.

Both pulp sizing and surface sizing are detrimental to the adhesion of the polyolefin coating applied later to the sized support material. A coating can accordingly be extruded over the surface only at a rate that usually does not exceed 150 to 180 m/min.

A waterproof support material for light-sensitive photographic coatings with a polyolefin coating on one or both sides is known, for example, from the U.S. Pat. No. 3,411,908. Also known, for example, from the European Patent Publication No. 290,852 are support materials with coatings of a polyolefin mixed with a copolymer of ethylene and another $\alpha$-olefin. Another known support material has a coating comprising just pigment in an ionomeric resin consisting of $\alpha$-olefines and $\alpha,\beta$-unsaturated monocarboxylic acids (see German Patent Publication No. OS 1,572,189).

A light-sensitive layer containing a silver halide is then applied to one of the plastic layers. The light-sensitive layer can be either a black-and-white or a color photography layer. Particular demands in relation to reflectivity, whiteness, smoothness, and sensitometry are made of the coating that the light-sensitive layer is applied to. The coating will accordingly contain such agents as white pigments, lubricants, antioxidants, brighteners, emulsifiers, antistatics, etc.

The subsequent application of layers of such hydrophilic substances as adhesion promoters containing gelatins and light-sensitive materials, and the use of aqueous photographic solutions for developing and fixing, demand that the coating adhere firmly tight to the support material. The trimmed edges of the photographic support material are particularly at risk because processing chemicals can penetrate into the unprotected material. When the adhesion between the coating and the support material is weak, they will delaminate and the edges will become ragged. Developer can also invade the support material at these areas and discolor it.

Various measures for improving the adhesion of a mainly polyolefin coating to a support are known. Increasing the temperature of the molten extruded polyolefin for example can increase the adhesion. Too high extrusion temperatures, however, are detrimental, especially in the presence of titanium dioxide as a white pigment. This substance is catalytically active and can accelerate decomposition of the resin. The decomposition can appear in the form of either yellowing or cloudiness due to the presence of breakdown products.

Another approach to improving adhesion is to subject the web to a corona. The U.S. Pat. Nos. 3,411,908 and 3,501,298 and the British Patent No. 1,005,631 for example, propose treating the support material with a corona to improve the adhesion of the polyolefin to it. Coronas, however, have several drawbacks. One is the relatively expensive high-voltage equipment. Another is that too powerful a corona will damage the support's internal sizing, exposing the trimmed edges to the developer.

Adhesion can also be improved with chemical adhesion promotors. Among these substances are copolymers of ethylene and vinyl acetate or acrylamide, ionomers, terpolymers, etc. The adhesion promotor is applied as an aqueous dispersion that forms an intermediate layer on the base paper. Such adhesion promotors are described for example in the German Patent No.

2,326,759 and the Japanese Patent Publication No. 49-15423. They usually do not ensure optimal adhesion. They entail an additional step that involves additional equipment. And the photographic quality of the overall support material can again be negatively affected.

Adhesion can also be improved by mixing synthetic fibers into the pulp. This approach is described in the German Patent No. 2,344,367 for example. The drawback is that a special pulp must be mixed.

It is also known that photographic base papers can be extrusion coated at only limited rates, of approximately 150 to 180 m/min.

SUMMARY OF THE INVENTION

The principal object of the present invention is accordingly to improve the adhesion of a polyolefin coating extruded onto a photographic base paper of the aforesaid type while avoiding the aforesaid expensive and time-consuming special measures, especially coronas.

This object, as well as other objects which will become apparent from the following discussion, is achieved, in accordance with the present invention, in a support material of the aforesaid type by the improvement wherein the polyolefin mixture comprising the coating contains at least one copolymer of an $\alpha$-olefin with an $\alpha,\beta$-unsaturated carboxylic acid.

The polyolefin is preferably a polyethylene (PE) or polypropylene (PP). The polyethylene can be a high-density polyethylene (HDPE), a low-density polyethylene (LDPE), a linear low-density polyethylene (LLDPE), or a mixture thereof. At least 5% and preferably 20% to 80% by weight of the mixture is copolymer. The $\alpha$-olefin in the copolymer is preferably either ethylene or propylene. At least 0.1% and preferably 0.5% to 15% by weight of the copolymer is $\alpha,\beta$-unsaturated carboxylic acid.

It has surprisingly been discovered that such a copolymer of an $\alpha$-olefin and an $\alpha,\beta$-unsaturated carboxylic acid will outstandingly improve the adhesion of such a coating to the surface of the support material.

The outstanding adhesion of the coating can be economically exploited to accelerate the process of extrusion coating the base paper far beyond what can be attained with conventional adhesion promotors. No difference in the crystalline hardness of the polyolefin layer can be measured. The coating can, however, be processed much more rapidly than other coatings can. The processing rate can, however, be increased even more by subjecting the base paper to a corona to improve its adhesion as well.

It is also possible to subject the outer surface of the coating itself to a corona to improve the adhesion of its photographic emulsion.

The $\alpha,\beta$-unsaturated carboxylic acid can be a monocarboxylic acid, acrylic or methacrylic acid for example, or a dicarboxylic acid, itaconic (methylene-succinic) acid for example. Appropriate dicarboxylic acids are those that do not tend to form anhydrides.

Preferred embodiments of the invention will now be specified with reference to the following examples. The test results listed in the accompanying table document the advantages of a photographic support material in accordance with the invention.

EXAMPLE 1

Approximately 30 g/m$^2$ of a mixture of 45% high-density polyethylene (Vestolen AV 7172, density 0.963 g/cm3, melt-flow index MFI 8) and 55% copolymer of ethylene and methacrylic acid (1.2% carboxylic acid, density 0.922 g/cm3, MFI 8) by weight was applied at an extrusion temperature of approximately 295° and rates of 180, 200, 220, 240, 270, and 290 m/min to the front side of a with starch surface-sized photographic base paper with a basis weight of 170 g/m$^2$.

EXAMPLE 2

The front side of a photographic base paper with a basis weight of 175 g/m$^2$ and surface-sized with polyvinyl alcohol was coated as described in Example 1 with approximately 40 g/m$^2$ of a mixture of 95% polyethylene and 5% of a copolymer of ethylene and methacrylic acid (containing 10.0% carboxylic acid) by weight.

EXAMPLE 3

The front side of a photographic base paper with a basis weight of 170 g/m$^2$ was coated with approximately 20 g/m$^2$ of a mixture of 20% polyethylene (Vestolen AV 7172) and 80% copolymer of ethylene and itaconic acid (0.5% carboxylic acid) by weight as described in the forgoing examples.

EXAMPLE 4

Approximately 30 g/m$^2$ of a mixture of 25% high-density polyethylene (Vestolen AV 7172, density 0.963 g/cm3, MFI 8), 20% titanium dioxide Masterbatch (PPM, 2073/1 with 50% rutile, MFI 20), and 55% copolymer of ethylene and methacrylic acid (1.2% carboxylic acid, density 0.922 g/cm3, MFI 8) by weight was applied at an extrusion temperature of approximately 295° and rates of 180, 200, 220, 240, 270, and 290 m/min to the front side of a with starch surface-sized photographic base paper with a basis weight of 170 g/m$^2$.

Reference Example 1

Both sides of a photographic base paper with a basis weight of 175 g/m$^2$ was treated with an aqueous dispersion of a copolymer of ethylene with vinyl acetate (Vinnapas EP1) (5 g/m$^2$) and coated with a polyethylene mixture (50% low-density and 50% high-density) subject to the extrusion conditions specified in Example 1.

Reference Example 2

A photographic base paper with a basis weight of 180 g/m$^2$ and surface-sized with starch was extrusion-coated with approximately 35 g/m$^2$ of a mixture of polyethylene (45% high-density and 55% low-density) as described with reference to Example 1.

The adhesion of the polyolefin to the base paper was tested by a method the applicant frequently employs. Strips of polyethylene 1 cm wide were lifted manually from the surface with a knife 1 and 2 hours after extrusion subject to identical conditions and then manually pulled off for another 20 cm in each machine direction.

The strips were visually evaluated along with whatever portion of the base paper adhered to them and assigned a grade of 1 to 5, with 1 designating a complete splitting in the base paper core and 5 delamination of the polyethylene film with the base paper fully intact. The results are shown in the following Table.

TABLE

Adhesion of Polyolefin to Photographic Base Paper Produced as described in Examples 1 through 4 and Reference Examples 1 and 2

| | Adhesion | | | | | | | | | | | | | | | | | |
|---|---|---|---|---|---|---|---|---|---|---|---|---|---|---|---|---|---|---|
| Machine Speed, | 1 | | | 2 | | | 3 | | | 4 | | | R1 | | | R2 | | |
| m/min | a | b | c | a | b | c | a | b | c | a | b | c | a | b | c | a | b | c |
| 180 | 1 | 1 | 1 | 1 | 1 | 1 | 1 | 1 | 1 | 1 | 1 | 1 | 1 | 1 | 1 | 1 | 1 | 1 |
| 200 | 1 | 1 | 1 | 1 | 1 | 1 | 1 | 1 | 1 | 1 | 1 | 1 | 3 | 2 | 4 | 1 | 1 | 2 |
| 220 | 1 | 1 | 1 | 1 | 1 | 1 | 1 | 1 | 1 | 1 | 1 | 1 | 5 | 4 | 5 | 2 | 2 | 5 |
| 240 | 1 | 1 | 1 | 1 | 1 | 1 | 1 | 1 | 1 | 1 | 1 | 1 | 5 | 5 | 5 | 3 | 2–3 | 5 |
| 270 | 2 | 1 | 1 | 3 | 1 | 1 | 2 | 1 | 1 | 3 | 1 | 1 | 5 | 5 | 5 | 5 | 5 | 5 |
| 290 | 4 | 2 | 1 | 4 | 3 | 2 | 4 | 3 | 2 | 4 | 2 | 2 | — | — | — | — | — | — |

a - immediately after extrusion
b - 1 hour later
c - subsequent to 2 hours at 60° C.

There has thus been shown and described a novel polyolefin-coated photographic support material that fulfills all the objects and advantages sought therefor. Many changes, modifications, variations, and other uses and applications of the subject invention will, however, become apparent to those skilled in the art after considering this specification which discloses the preferred embodiments thereof. All such changes, modifications, variations, and other uses and applications that do not depart from the spirit and scope of the invention are deemed to be covered by the invention, which is to be limited only by the claims that follow.

What is claimed is:

1. In a photographic support material with a coating on one side comprising a mixture of olefin polymers and auxiliary agents, the improvement wherein the coating consists essentially of a polyolefin and at least one copolymer of an $\alpha$-olefin with an $\alpha,\beta$-unsaturated carboxylic acid thereby improving the adhesion.

2. The photographic support material defined in claim 1, wherein at least 5% by weight of the mixture is copolymer.

3. The photographic support material defined in claim 1, wherein 20% to 80% by weight of the mixture is copolymer.

4. The photographic support material defined in claim 1, wherein the $\alpha$-olefin in the copolymer is either ethylene or propylene.

5. The photographic support material defined in claim 1, wherein at least 0.1% by weight of the copolymer is $\alpha,\beta$-unsaturated carboxylic acid.

6. The photographic support material defined in claim 1, wherein 0.5% to 15% by weight of the copolymer is $\alpha,\beta$-unsaturated carboxylic acid.

7. The photographic support material defined in claim 1, wherein the $\alpha,\beta$-unsaturated carboxylic acid is a monocarboxylic acid.

8. The photographic support material defined in claim 7, wherein the $\alpha,\beta$-unsaturated carboxylic acid is an acrylic or methacrylic acid.

9. The photographic support material defined in claim 1, wherein the $\alpha,\beta$-unsaturated carboxylic acid is a dicarboxylic acid.

10. The photographic support material defined in claim 9, wherein the $\alpha,\beta$-unsaturated carboxylic acid is itaconic acid.

11. The photographic support material defined in claim 1, wherein 10 to 45 $g/m^2$ of the mixture is applied to each side.

12. The photographic support material defined in claim 1, wherein the base paper is first surface-sized with sizing agents selected from the group consisting of starch, gelatin, carboxymethylcellulose, and polyvinyl alcohol and then extrusion coated with the polyolefin.

13. The photographic support material defined in claim 1, wherein the coating on at least one side of the base paper has been treated by a corona.

14. The photographic support material defined in claim 1, wherein at least one side of the base paper has been treated by a corona.

15. The photographic support material defined in claim 1, wherein said auxiliary agents include a white pigment.

* * * * *